US005513772A

United States Patent [19]

Glaser

[11] Patent Number: 5,513,772

[45] Date of Patent: May 7, 1996

[54] VENDING MACHINE

[75] Inventor: Robert L. Glaser, Appleton, Wis.

[73] Assignee: L. M. Becker & Co., Inc., Kimberly, Wis.

[21] Appl. No.: 325,002

[22] Filed: Oct. 18, 1994

[51] Int. Cl.[6] .............................. B65G 59/04; B65H 3/08

[52] U.S. Cl. .............................. 221/211; 221/24; 221/199

[58] Field of Search .............................. 221/24, 199, 211, 221/278; 273/447, 448

[56] References Cited

U.S. PATENT DOCUMENTS

| | | | |
|---|---|---|---|
| D. 96,564 | 8/1935 | Simpkins . | |
| 1,630,195 | 5/1927 | Margolith . | |
| 1,770,305 | 7/1930 | Fleischer . | |
| 1,964,905 | 7/1934 | Butterworth | 294/112 |
| 1,984,997 | 12/1934 | Smith | 221/146 |
| 1,997,701 | 4/1935 | Smith | 240/2 |
| 1,998,625 | 4/1935 | Kirk | 221/144 |
| 2,037,311 | 4/1936 | Butterworth | 312/114 |
| 4,685,673 | 8/1987 | Verstraeten | 273/448 |
| 4,718,667 | 1/1988 | Schoemaker, Jr. | 273/1 GC |
| 4,976,376 | 12/1990 | Williams | 221/24 |
| 5,271,628 | 12/1993 | Okada | 273/448 |
| 5,358,219 | 10/1994 | Shenk et al. | 273/448 X |
| 5,397,134 | 3/1995 | Fishman et al. | 273/448 |

FOREIGN PATENT DOCUMENTS

| | | | |
|---|---|---|---|
| 2455673 | 5/1976 | Germany | 221/211 X |

OTHER PUBLICATIONS

Clean Sweep Candy Crane manual published by Smart Industries Corp., dated Dec. 22, 1993, admitted prior art.

Operating and installation instructions for Lamb Thru Flow Vacuum Motor published by Ametek, Lamb Electric Division, dated 1982.

A Coin Concepts, Inc. advertisement for a Jumbo Elephant Machine published on p. 93 of the Nov. 1989 issue of Vending Times.

An advertisement of Betson Enterprises for a Jumbo The Elephant Machine published on p. 80 of the Dec. 1989 issue of Vending Times.

*Primary Examiner*—William E. Terrell
*Assistant Examiner*—Dean A. Reichard
*Attorney, Agent, or Firm*—Quarles & Brady

[57] ABSTRACT

An improved crane type vending machine is disclosed. It provides the customer the opportunity to position a vacuum suction inlet over a selected product item and initiate the descent of the suction inlet so as to pick up the product. The machine deposits the item in a dispensing chute. The suction device may be a vacuum motor housed in a flying saucer. A telescoping structure prevents the motor from twisting the electrical lead. A limit switch disconnects the suction motor from electrical power when it is over the product outlet and reconnects the power when it moves away. The product items may be encased in plastic bags.

10 Claims, 3 Drawing Sheets

FIG.1
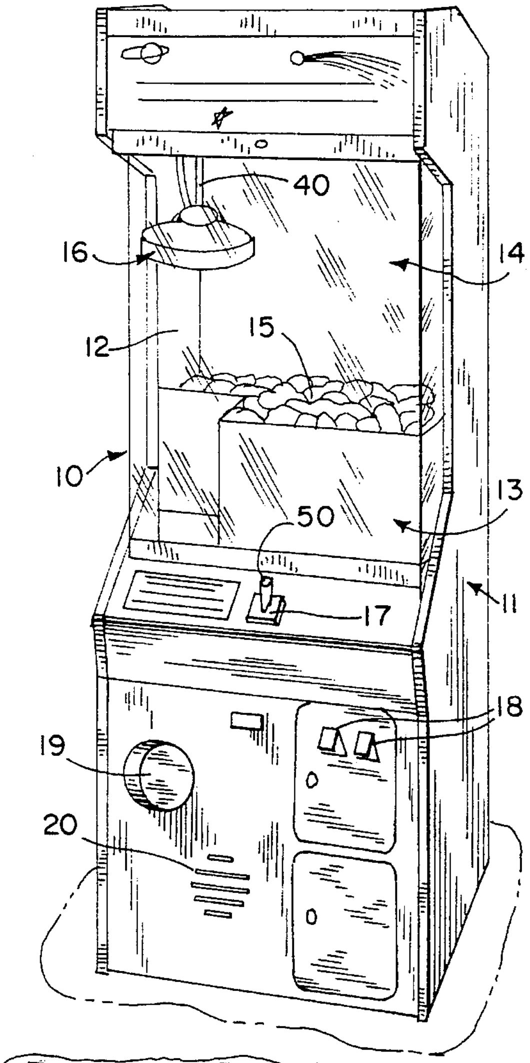
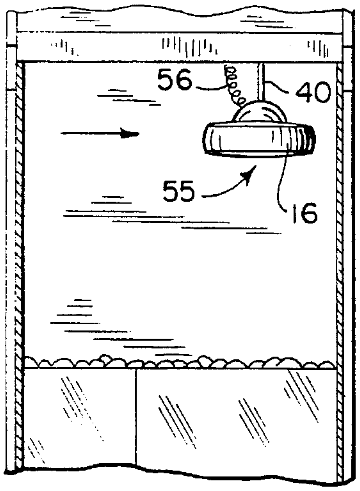
FIG. 2
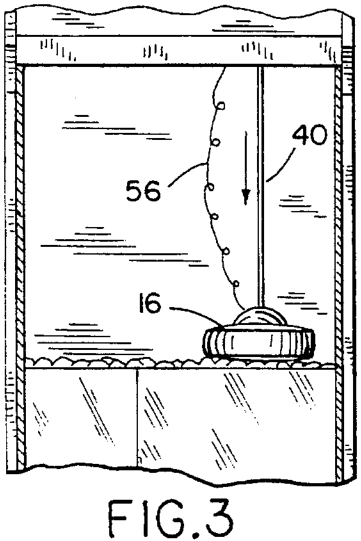
FIG.3
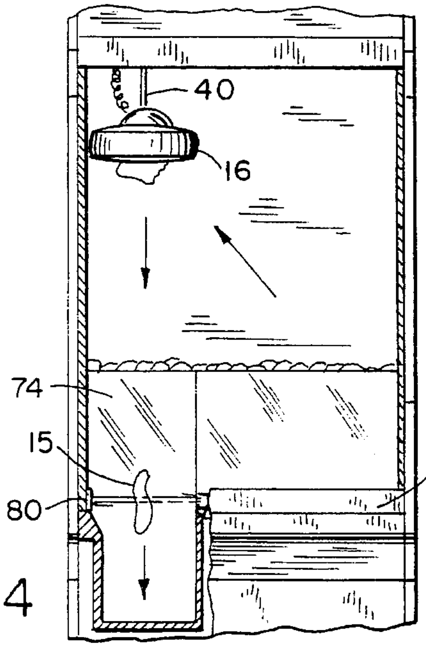
FIG.4

FIG. 5
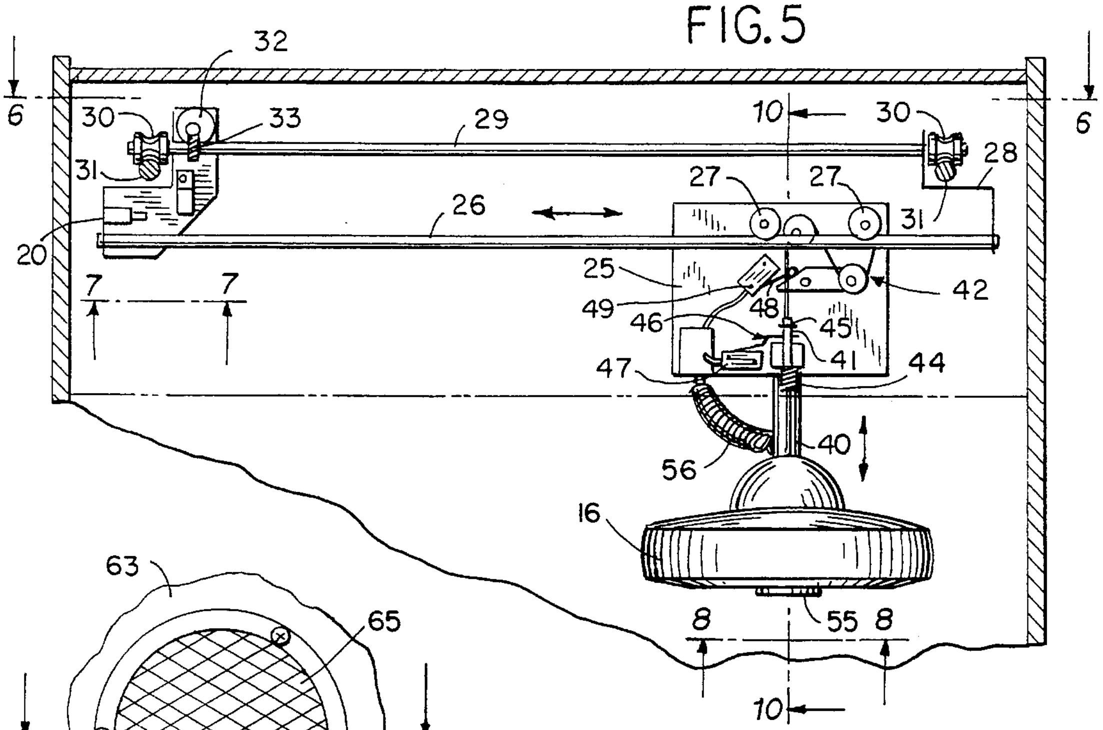
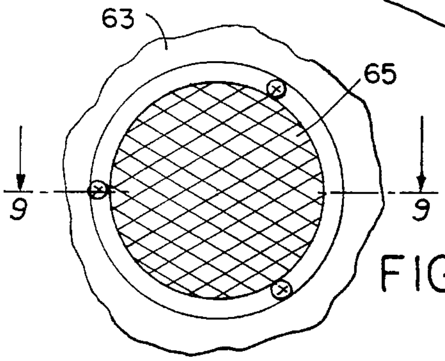
FIG. 8
FIG. 6
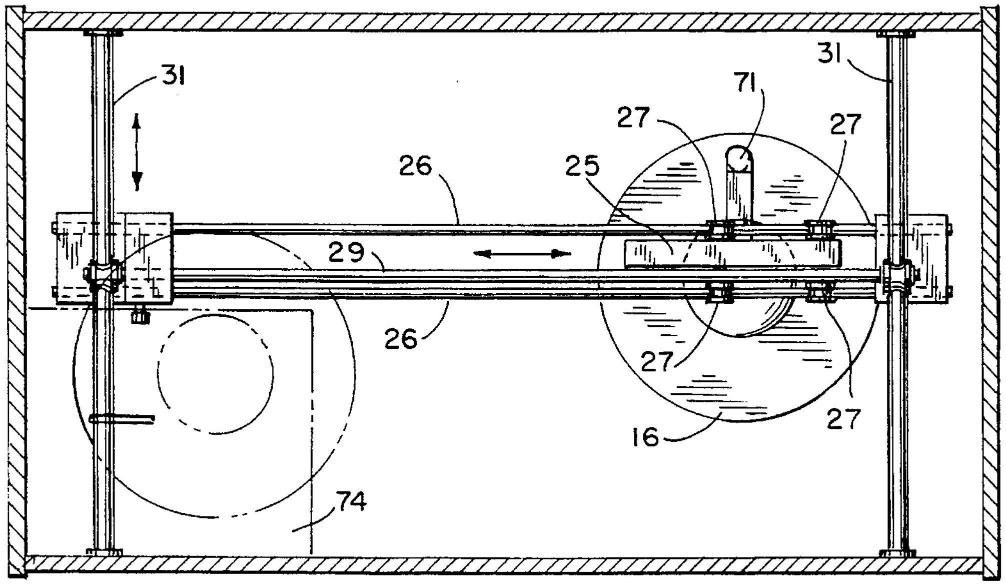

FIG. 7
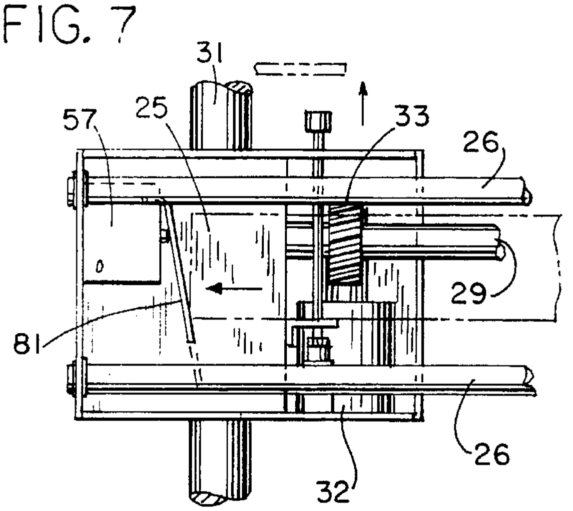
FIG. 9
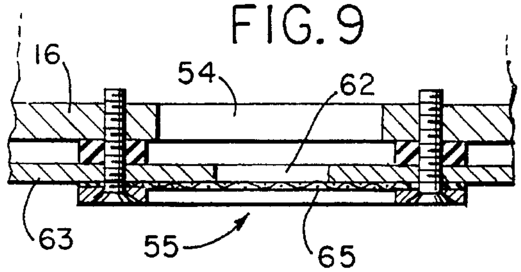
FIG. 10
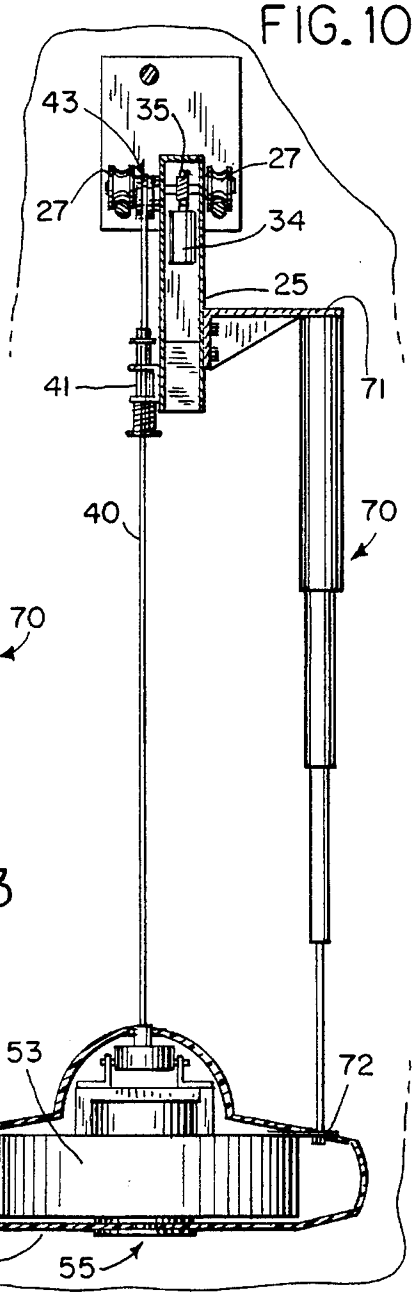
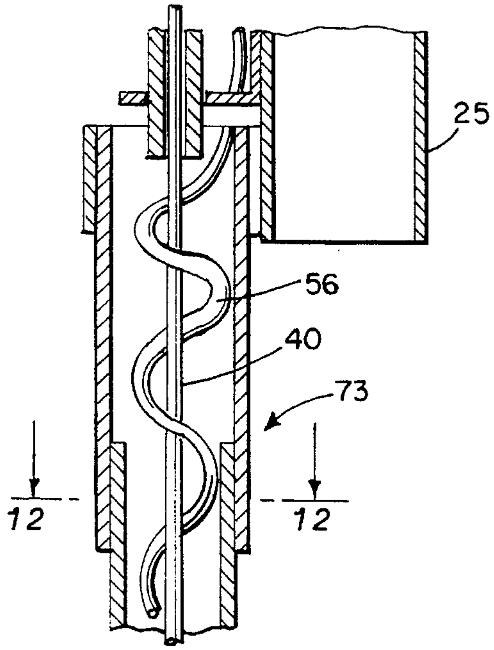
FIG. 11
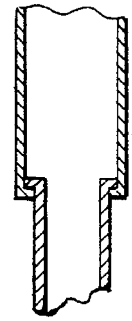
FIG. 13
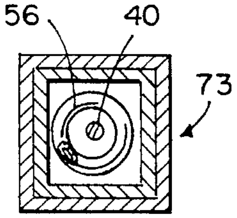
FIG. 12

VENDING MACHINE

BACKGROUND OF THE INVENTION

1. Field Of Invention

This invention relates to vending machines which dispense a product after giving a customer the opportunity to use a remotely controlled device to attempt to select a particular product from a product storage container.

2. Description Of The Art

Crane vending machines are well known. In them, the deposit of one or more coins or tokens enables a customer to operate a joy stick or other control mechanism to position a crane-type jaw or claw over a particular product in the storage container and to initiate a sequence in which the jaw or claw drops, grasps a product item, moves to a chute and drops the product item into the chute. Some machines of this type have been produced by Smart Industries Corp., Mfg. (e.g., their Candy crane machine Model 5802).

In such machines, the jaw or claw sometimes has difficulty grasping products of different sizes and configurations (or is at least perceived as having this difficulty). Further, for certain types of products consistency in picking up only one item per time may be a problem. In addition, a crane may seem low-tech and uninteresting to customers reared in the space age and accustomed to more space oriented video games.

Therefore, there is a need for a vending machine which will rarely retrieve more than one product, can retrieve products of different sizes and configurations, and is more attractive to the modern customer.

SUMMARY OF THE INVENTION

The invention provides a vending machine of the type which enables a customer to control a mechanism which can pick up a product in a merchandise storage chamber when the product is in the chamber and deposit it in an outlet so as to make the product accessible to the customer. The vending machine includes a housing having an internal merchandise storage chamber defined by a bottom wall and side walls. A carriage which is suspended over the chamber is adapted to be movable in response to remote control to a plurality of lateral positions over the bottom wall. At least one of the positions is in essentially vertical alignment with the outlet. A suction inlet which is suspended from the carriage is adapted to be movable in response to remote control to a plurality of heights over the bottom wall. There is provided a control system by which the customer can control the lateral position of the suction inlet and can at least initiate a vertical movement of the suction inlet. There is a suction-producing device in communication with the suction inlet.

In one aspect, the invention provides in the storage chamber a product which is encased in a material having a smooth and substantially air-impermeable surface. For example, the product may be encased in a bag.

In a further aspect, the suction-producing device is an electric vacuum motor attached to the carriage. There may be a limit switch positioned to turn off the vacuum motor when the suction inlet is positioned essentially over the outlet, and the motor may have a lower air inlet hole that is covered by a screen.

Another aspect of the invention provides an electric lead connecting the motor to a power source and means for preventing the lead from becoming twisted when the motor is on. In one aspect, the means for preventing the lead from being twisted comprises a telescoping support linking the vacuum motor and the carriage.

In practicing the invention, the weight and dimensions of the product, the dimensions and material of the bag, the power of the suction-producing device, and the size of the suction inlet may be such that, in the course of picking up products in the storage chamber which is filled with product to its normal capacity, over the course of ten test tries, the ratio of one-product pickups by the suction inlet to the sum of one-product pickups and multi-product pickups is at least 0.9, and may be at least 0.95.

It will be appreciated that the invention provides improvements in vending machines. Housing that vacuum motor in a flying saucer offers a new and interesting experience to customers who would find a crane relatively uninteresting. The suction device, when used with bagged products, can reduce the risk that no product item will be retrieved (and as a result the operation cycle of the vend will be unnecessarily extended).

Note that to achieve this several additional problems (apart from the concept of using the vacuum) needed to be solved. For example, the spinning of the saucer as a reaction to the rotation of the motor parts had to be controlled in order to avoid twisting the electrical power cord. Also, by providing a product encased in a plastic bag, the present invention allows the suction device to pick up a product, such as a stuffed animal, having fuzzy or rough surfaces that would otherwise not be suitable to use with suction. It was also necessary to find a way to automatically disconnect the suction device from electrical power when it was in the rest position over the product chute (to avoid motor burn out), even though electricity was still provided to the carriage. This was because, to avoid legal issues regarding gambling, such machines often must be designed to continue play if nothing is picked up (even though the crane has returned to its start position).

The objects of the invention therefore include providing a customer-controlled pick-up vending machine which today's customers would find attractive and interesting and which can reliably retrieve products of different sizes and configurations.

These and other objects and advantages of the invention will be apparent from the description which follows. The preferred embodiments will be described in reference to the accompanying drawings. These embodiments do not represent the full scope of the invention, but rather the invention may be employed in other embodiments. Reference should therefore be made to the claims herein for interpreting the breadth of the invention.

BRIEF DESCRIPTION OF THE DRAWINGS

FIG. 1 is a perspective view of a vending machine embodying the present invention;

FIGS. 2, 3 and 4 are partial front views showing the suction device over the merchandise, having dropped down near the merchandise and having picked up an item, and having moved to a position over the delivery chute, respectively;

FIG. 5 is an enlarged partial front cross-sectional view illustrating the carriage, track structure and saucer shaped motor housing;

FIG. 6 is a cross-sectional view taken on plane 6—6 of FIG. 5;

FIG. 7 is a view taken on plane 7—7 of FIG. 5;

FIG. 8 is a view taken on plane 8—8 of FIG. 5;

FIG. 9 is a cross-sectional view taken on plane 9—9 of FIG. 8;

FIG. 10 is a cross-sectional view taken on plane 10—10 of FIG. 5 showing one embodiment with a telescoping structure;

FIG. 11 is a partial view of another embodiment having a telescoping structure;

FIG. 12 is a cross-sectional view taken through plane 12—12 of FIG. 11, and

FIG. 13 is a cross-sectional view of the telescoping structure of FIG. 10.

DESCRIPTION OF THE PREFERRED EMBODIMENTS

FIG. 1 illustrates a vending machine 10 having a vertically elongated, essentially four sided housing 11. The interior of the housing's upper portion, which is visible to the customer through a transparent wall 12, includes a merchandise storage chamber 13 (defined by a bottom wall and side walls) with an open space 14 above it. The storage chamber 13 is filled with a multitude of individual product items 15, such as toys or stuffed animals. Preferably these are placed in sealed plastic bags.

In the open "hovering" area 14, the customer will see a flying saucer which, as will be described below, is a motor housing 16. At the front of the machine are mounted the usual joy stick controller 17, coin inlets 18, a product outlet 19 and a loudspeaker grill 20. The portions of the machine below the storage chamber 13 (e.g., the control circuits,) can be from a conventional machine such as the Smart crane machine.

As can best be seen in FIGS. 5 and 6, the motor housing 16 is suspended from a carriage 25, which in turn is suspended from a pair of left/right oriented tubular tracks 26 by means of four grooved wheels 27 which are mounted on the front and back of the carriage 25 and which ride on the tracks 26. The left/right tracks 26 are in turn suspended by means of brackets 28 from a horizontal support bar 29 which is parallel to tracks 26. The support bar 29 supports on each end a grooved wheel 30, each of which rides on a front/back oriented horizontal track 31. As a result of this arrangement, the carriage 25 can be positioned to a plurality of lateral positions over the storage chamber 13. This type of tracking system is known in the art (e.g., the Smart crane machine).

Power to move the carriage in a front/back direction is provided by an electric motor 32 (FIGS. 5 & 7) mounted at an end of a left/right track 26 and arranged so as to rotate horizontal support bar 29 via gear 33 and thereby rotate grooved wheels 30. Power to move the carriage in a left/right direction is provided by a motor 34 (see FIG. 10) which is mounted in the carriage 25 so as to rotate a pair of the wheels 27 via a gear 35. This motor arrangement is also conventional (e.g., the Smart crane machine). The motors 32 and 34 are under the control of the joy stick 17 by conventional means, which may include a microprocessor.

As best seen in FIGS. 5 and 10, the motor housing 16 is suspended from a cord 40 which passes up through a bushing 41 through an idler mechanism 42 and to a takeup reel 43 (FIG. 10) which is driven by a an electric motor (the "take-up motor", not shown) which is adjacent to the motor 34 in the carriage 25. The take-up motor can unwind the cord 40 and thereby lower the motor housing 16 or wind up the cord 40 and thereby raise the motor housing 16. As the motor housing 16 reaches a fully raised position, it collides with a bumper 44 on the lower end of the bushing 41 and drives the bushing 41 upward, which moves a bushing cap 45, mounted on the upper end of the bushing 41, up and off of the lever arm 46 of a limit switch 47. This shuts off the take-up motor and initiates a microprocessor controlled sequence which moves the carriage to its home position, to be described below.

In the other direction, when the motor 34 has allowed the motor housing 16 to descend until it is resting on the products 15 in the storage container 13 or until the cord 40 has reached the limit of its length, the idler mechanism 42 operates to move the lever arm 48 of the limit switch 49. This initiates a microprocessor controlled sequence which begins with the reversal of the take-up motor, thereby raising the motor 16. The descent of the motor housing 16 is at least initiated by a button 50 on the joy stick controller 17.

As illustrated in FIG. 10, in accordance with the present invention, a vacuum motor 53 is mounted in the motor housing 16. In the preferred embodiment, the vacuum motor 53 is a 120 volt, 50/60 Hz through-flow vacuum motor. A Model 116309-00 motor manufactured by Lamb Electric Division of Ametek, Inc. of Kent, Ohio has proved to be particularly advantageous. The vacuum motor 53 develops a suction at a bottom air inlet 54 and discharges air through an outlet (not shown) at the top. Separate (apart from the carriage motor power) electrical power is provided to the vacuum motor 53 by a coiled electrical cord 56. It is controlled by a limit switch 57 (see FIG. 7) which is electrically connected to a source of electricity and to the electrical cord 56.

As noted above and as shown in FIG. 10, the vacuum motor 53 is encased in a motor housing 16. As best seen in FIGS. 9 and 10, the motor housing 16 has a restricted air opening 62 in its bottom wall 63. As shown in FIG. 9, the vacuum motor 53 and the motor housing 16 are assembled so that the air inlet 54 of the motor 53 and the bottom opening 62 of the housing 16 are in line so as to form a reduced suction inlet 55 for taking air into the motor. A screen or mesh fabric 65 (FIG. 8) is attached over opening 62 of the motor housing 16, as is shown in FIG. 9.

The bottom wall 63 of the motor housing 16 may be provided with a larger or smaller bottom opening 62 depending on the size and weight of the product 15, in order to optimize the number of successful pickups of only one product item 15. The mesh 65 serves to eliminate the chance of a product 15 becoming jammed in the opening 62 of the vacuum motor housing 60.

In operation, the vacuum motor 53 produces a torque which tends to rotate the motor 53 and its housing 16. Unchecked, this would twist the electrical cord 56 and ultimately seriously harm the system. The present invention also provides structures to solve this problem.

One embodiment of a telescoping structure is illustrated in FIGS. 10 and 13. A telescoping tube 70 is mounted to the carriage 25 by means of a top bracket 71. The lower end of the telescoping tube 70 is attached to the motor 53 by means of a lower bracket 72. Because the carriage 25 does not rotate, the telescoping tube 70 prevents the vacuum motor 53 and its housing 16 from rotating.

A second embodiment of a telescoping structure is illustrated in FIG. 11. Instead of a side mounted telescoping tube 70, there is attached to the carriage 25 a hollow, elongated, rectangular telescoping box 73 which surrounds the cord 40 that supports the vacuum motor 16 and the electrical cord 56 which provides electricity to it. The upper end of the telescoping box 73 is attached to the carriage 25 and its lower end is attached to the motor housing 16 or directly to the vacuum motor 53, thereby preventing the vacuum motor 53 from rotating.

FIG. 4 and FIG. 6 (broken line) show the "home" position of the motor housing 16 when the machine is not in use and is at rest. The home position is over a chute 74 which leads to the product outlet 19. When the customer inserts the necessary coins or tokens, internal circuitry activates the joy stick controller 17. By manipulating the joy stick, the customer can, for a fixed period (e.g., 20–30 seconds), move the motor housing 16 in a left/right direction and in a front/back direction to a lateral position chosen by the customer, presumably in substantial vertical alignment with a product item 15 which the customer would like to capture. Such a position is shown in FIG. 2 and in solid line in FIG. 6. After positioning the motor housing 16, the customer can press the joy stick button 50, which through internal circuitry allows the motor housing 16 to drop toward the products 15 in the storage chamber 13. This initiates an automatic cycle in which the motor housing 16 drops onto the top layer of products (FIG. 3), pauses, rises automatically to the highest position, moves to the home position over the chute 74, and releases the product 15 (if any was picked up) into the chute 74 (FIG. 4). If desired, a timer sequence can cause the saucer to drop automatically after 20–30 seconds if the customer has not by then made a decision to drop the saucer.

The chute 74 can be equipped with a photoelectric sensor 80. If the photoelectric sensor 80 senses the passage of the product item 15 through the sensor beam, it deactivates the joy stick controller 17 and the game is over.

However, if the vacuum motor 16 failed to pick up a product item and therefore the photoelectric sensor 80 is not triggered, the joy stick controller 17 remains activated and the customer may try again until delivery of a product item 15 is achieved.

When the motor housing 16 leaves the home position, the vacuum must be activated. Also, when it reaches the home position, it is necessary to switch off the electricity being provided to the vacuum motor 53. This is accomplished by the limit switch 57 which is mounted on a side wall of the machine housing 11 adjacent the chute (see FIG. 7). As the carriage 25 leaves or reaches the home position, it affects the biased lever arm 81 of the limit switch 57, thereby connecting or disconnecting the vacuum motor 53 from the electricity.

The merchandise which might be vended in such a machine will often be of irregular shape (e.g., stuffed figures having a fuzzy surface). Such irregular surfaces do not lend themselves to be picked up by suction. Thus, they are preferably encased in a material having a smooth and substantially air-impermeable surface. For example, the product may be encased in a plastic bag (e.g., a heat sealed or a Zip-lock™ reclosable bag) or plastic capsule or "egg" which will present a broad and more regular surface to the suction inlet 55.

To achieve a high ratio of one-product pickups for a type, weight, and size of product, one can vary the power of the vacuum motor 53, the size of the suction inlet 55, and the coarseness of the mesh or screen 65 covering the suction inlet 55.

The invention is designed to attract space age customers (especially those who may no longer be intrigued by operating a crane, but who are attracted by the ability to manipulate a flying saucer). In addition, the suction/bag retrieval system may improve the customer's perception of the likelihood of quickly obtaining a desired product.

Although the preferred embodiments of the invention have been described above, the invention claimed is not so restricted. There may be various other modifications and changes to these embodiments which are within the scope of the invention. For example, the vacuum motor 53 may be mounted directly onto the carriage 25 or on a stationary structure, such as a wall of the housing 11. In that case, a flexible tube (e.g., like one from a vacuum cleaner) could extend from the vacuum motor 53 to a structure, such as a flying saucer shaped housing, containing the suction inlet 55. Thus, the invention is not to be judged by the specific description above, but should be judged by the claims which follow.

I claim:

1. A vending machine of the type which enables a customer to control a mechanism which can pick up a product in a merchandise storage chamber when the product is in the chamber and deposit it in an outlet so as to make the product accessible to the customer, the vending machine comprising:

- a housing having an internal merchandise storage chamber, the chamber being defined by a bottom wall and side walls;
- a carriage suspended over the chamber and adapted to be movable in response to remote control to a plurality of lateral positions over the bottom wall, at least one of the positions being in essentially vertical alignment with the outlet;
- a suction inlet suspended from the carriage and adapted to be movable in response to remote control to a plurality of heights over the bottom wall;
- a control system by which the customer can control the lateral position of the suction inlet and can at least initiate a vertical movement of the suction inlet; and
- a suction-producing device in communication with the suction inlet, the suction-producing device being an electric vacuum motor attached to the carriage.

2. A vending machine of the type which enables a customer to control a mechanism which can pick up in a product in a merchandise storage chamber when the product is in the chamber and deposit it in an outlet so as to make the product accessible to the customer, the vending machine comprising:

- a housing having an internal merchandise storage chamber, the chamber being defined by a bottom wall and side wall;
- a carriage suspended over the chamber and adapted to be movable in response to remote control to a plurality of lateral positions over the bottom wall, at least one of the positions being in essentially vertical alignment with the outlet;
- a suction inlet suspended from the carriage and adapted to be movable in response to remote control to a plurality of heights over the bottom wall;
- a control system by which the customer can control the lateral position of the suction inlet and can at least initiate a vertical movement of the suction inlet;
- a suction-producing device in communication with the suction inlet; and
- a product in the storage chamber which is encased in a material having a smooth and substantially air-impermeable surface.

3. A vending machine as in claim 2, wherein a product in the storage chamber is encased in a bag.

4. A vending machine as in claim 1, wherein the motor has a lower air inlet hole that is covered by a screen.

5. A vending machine as in claim 1, further comprising a limit switch positioned to turn off the vacuum motor when the suction inlet is positioned essentially over the outlet.

6. A vending machine as in claim 1, further comprising an electric lead connecting the motor to a power source, and means for preventing the lead from becoming twisted when the motor is on.

7. A vending machine as in claim 6, in which the means for preventing the lead from being twisted comprises a telescoping support linking the vacuum motor and the carriage.

8. A vending machine as in claim 1, in which the electric motor is attached directly on the carriage and communication between the electric motor and the suction inlet is provided by a flexible tube.

9. A vending machine as in claim 1, in which the electric motor is mounted to move with the suction inlet.

10. A vending machine of the type which enables a customer to control a mechanism which can pick up a product in a merchandise storage chamber when the product is in the chamber and deposit it in an outlet so as to make the product accessible to the customer, the vending machine comprising:

a housing having an internal merchandise storage chamber, the chamber being defined by a bottom wall and side walls;

a carriage suspended over the chamber and adapted to be movable in response to remote control to a plurality of lateral positions over the bottom wall, at least one of the positions being in essentially vertical alignment with the outlet;

a suction inlet suspended from the carriage and adapted to be movable in response to remote control to a plurality of heights over the bottom wall;

a control system by which the customer can control the lateral position of the suction inlet in at least two directions which are not parallel to each other and can, when satisfied with the lateral position, at least initiate a vertical movement of the suction inlet; and a suction-producing device in communication with the suction inlet.

* * * * *

UNITED STATES PATENT AND TRADEMARK OFFICE
CERTIFICATE OF CORRECTION

PATENT NO. : 5,513,772
DATED : May 7, 1996
INVENTOR(S) : Robert L. Glaser

It is certified that error appears in the above-indentified patent and that said Letters Patent is hereby corrected as shown below:

In col 6, line 42, the word "in" between "up" and "a" is deleted.

Signed and Sealed this

Twentieth Day of August, 1996

Attest:

Bruce Lehman

BRUCE LEHMAN

*Attesting Officer*

*Commissioner of Patents and Trademarks*